United States Patent
Usui

(10) Patent No.: US 10,318,058 B2
(45) Date of Patent: Jun. 11, 2019

(54) CONTROL CIRCUIT FOR RESISTIVE FILM TOUCH PANEL

(71) Applicant: ROHM CO., LTD., Ukyo-ku, Kyoto (JP)

(72) Inventor: Hirotoshi Usui, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/684,441

(22) Filed: Aug. 23, 2017

(65) Prior Publication Data

US 2018/0059860 A1 Mar. 1, 2018

(30) Foreign Application Priority Data

Aug. 24, 2016 (JP) .................................. 2016-163666

(51) Int. Cl.
*G06F 3/045* (2006.01)
*G06F 3/041* (2006.01)

(52) U.S. Cl.
CPC ............ *G06F 3/0416* (2013.01); *G06F 3/045* (2013.01)

(58) Field of Classification Search
CPC .............................. G06F 3/0416; G06F 3/045
See application file for complete search history.

(56) References Cited

U.S. PATENT DOCUMENTS 8,149,102 B1 *  4/2012  Miller .................... H04W 4/38
                                                340/506
8,542,203 B2 *  9/2013  Serban ............... H03K 17/9622
                                                178/18.01
2009/0309852 A1 * 12/2009  Lin ........................ G06F 3/0383
                                                345/174
2010/0097343 A1 *  4/2010  Fang ..................... G06F 3/0416
                                                345/174
2016/0170554 A1 *  6/2016  Chang ................... G06F 3/0416
                                                345/173

FOREIGN PATENT DOCUMENTS

JP          2009048233 A        3/2009

OTHER PUBLICATIONS

Microchip (AR1000 Series Resistive Touch Screen Controller DS41393A, 2009, retrieved Sep. 19, 2018 from http://ww1.microchip.com/downloads/en/DeviceDoc/41393A.pdf).*

* cited by examiner

*Primary Examiner* — Mark Edwards
(74) *Attorney, Agent, or Firm* — Cantor Colburn LLP

(57) ABSTRACT

A control circuit for a resistive film touch panel is provided. The control circuit comprises a first pin through a fifth pin. An A/D converter circuit is capable of selecting at least one from among the first pin through the fourth pin, and of converting the voltage at at least the one pin thus selected into a digital value. A bias circuit is capable of selectively generating a combination of electrical states including a first predetermined voltage state, a second predetermined voltage state, and a high-impedance state. A logic circuit processes an output signal of the A/D converter circuit.

8 Claims, 10 Drawing Sheets

US 10,318,058 B2

CONTROL CIRCUIT FOR RESISTIVE FILM TOUCH PANEL

CROSS-REFERENCE TO RELATED APPLICATIONS

The present application claims priority under 35 U.S.C. § 119 to Japanese Patent Application No. 2016-163666, filed on Aug. 24, 2016, the entire content of which are incorporated herein by reference.

BACKGROUND OF THE INVENTION

1. Field of the Invention

The present invention relates to a touch input device employing a resistive film.

2. Description of the Related Art

It has become mainstream for electronic devices such as smartphones, tablet terminals, laptops or portable audio devices, digital still cameras, game machines, car navigation apparatuses, etc., to include an input apparatus which allows the user to operate the electronic device by touching with the fingers. Known examples of such input devices include resistive film touch panels (touch sensors) (Japanese Patent Application Laid Open No. 2009-48233).

FIG. 1 is a diagram showing a configuration of a resistive film touch panel. A resistive film touch panel (which will simply be referred to as the "touch panel" hereafter) 900 includes a first resistive film 902 and a second resistive film 904. The first resistive film 902 and the second resistive film 904 are arranged with an interval between them in the Z direction. The first resistive film 902 has a first electrode 906 and a second electrode 908 respectively formed along two sides extending in the X direction. The second resistive film 904 has a third electrode 910 and a fourth electrode 912 respectively formed along two sides extending in the Y direction. The wires (or terminals) $X_P$, $X_N$, $Y_P$, and $Y_N$, respectively coupled to the four electrodes, are drawn from a common side 914.

A touch is detected in a state in which a predetermined voltage $V_P$ is applied to the wire $X_P$, and a voltage $V_N$ is applied to the wire $Y_N$. When the user touches the touch panel 900 in this state, the electrical states that occur at the wires $X_N$ and $Y_P$, i.e., current or voltage, change according to the touched coordinate position. Accordingly, by measuring the electrical state for each of the wires $X_N$ and $Y_P$, the coordinate position can be calculated.

SUMMARY OF THE INVENTION

The present invention has been made in view of such a situation. Accordingly, it is an exemplary purpose of the present invention to provide a control circuit that is applicable to various configurations of resistive film touch panels.

An embodiment of the present invention relates to a control circuit for a resistive film touch panel. The control circuit comprises: a first pin, a second pin, a third pin, a fourth pin, and a fifth pin; an A/D converter circuit structured to be capable of selecting at least one from among the first pin through the fourth pin, and to be capable of converting a voltage at at least one pin thus selected into a digital value; a bias circuit structured to be capable of selectively generating a combination of electrical states including a first predetermined voltage state, a second predetermined voltage state, and a high-impedance state, for the first pin through the fifth pin; and a logic circuit structured to control the A/D converter circuit to select a pin, to control the combination of the electrical states to be generated by the bias circuit, and to process an output signal of the A/D converter circuit.

With the embodiment, this allows multiple resistive film touch panels or different kinds of touch panels to be controlled by means of a single control circuit. Accordingly, this allows the circuit mounting area to be reduced as compared with an arrangement in which a control circuit is required for every resistive film touch panel.

Also, the logic circuit may be structured to be switchable between: a first mode in which a single four-line resistive film touch panel is controlled using the first pin through the fourth pin; and a second mode in which two three-line resistive touch panels are controlled using the first pin through the fifth pin.

Also, in addition to the first mode and the second mode, or otherwise instead of either one from among the first mode or the second mode, the logic circuit may be structured to be switchable to a third mode in which a single five-line resistive film touch panel is controlled using the first pin through the fifth pin.

Also, in addition to the first mode and the second mode, or otherwise instead of either one from among the first mode or the second mode, the logic circuit may be structured to be switchable to a fourth mode in which two two-line resistive film touch panels are controlled using the first pin through the fourth pin.

Also, the first pin through the fifth pin may be arranged along one side of a package. In a case in which multiple resistive film touch panels are used as an operation interface, an arrangement can be assumed in which these touch panels are arranged side by side or in parallel. In such a case, by arranging the first pin through the fifth pin along one side of the control circuit, this allows the wiring pattern layout to be simplified.

Also, the control circuit may comprise multiple sets each comprising the first pin through the fourth pin. Also, the fifth pin may be shared by the multiple sets. Also, the mode may be settable for each of the sets. This allows multiple four-line or five-line resistive film touch panels to be controlled by means of a single control circuit. Also, by configuring the fifth pin as a common pin shared by the multiple sets, this suppresses an increase in the number of pins.

Also, the A/D converter circuit may comprise a single A/D converter to be used by the multiple sets in a time sharing manner. This allows the chip area required for the control circuit to be reduced.

Also, the first pins through the fifth pins for all the sets may be arranged along one side of the package. In a case in which multiple resistive film touch panels are used as an operation interface, an arrangement can be assumed in which these touch panels are arranged side by side or in parallel. In such a case, by arranging the first pins through the fifth pins along one side of the control circuit, this allows the wiring pattern layout to be simplified.

Also, the resistive film touch panel may have a rectangular shape having a long side in one direction. Also, the logic circuit may be structured to divide the resistive film touch panel into at least one dead region and multiple effective regions partitioned by the at least one dead region such that the regions are arranged in a longitudinal direction. Also, the logic circuit may be structured to be capable of judging which effective region has been touched. This allows a single resistive film touch panel to function as if it was multiple individual touch panels.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 1:
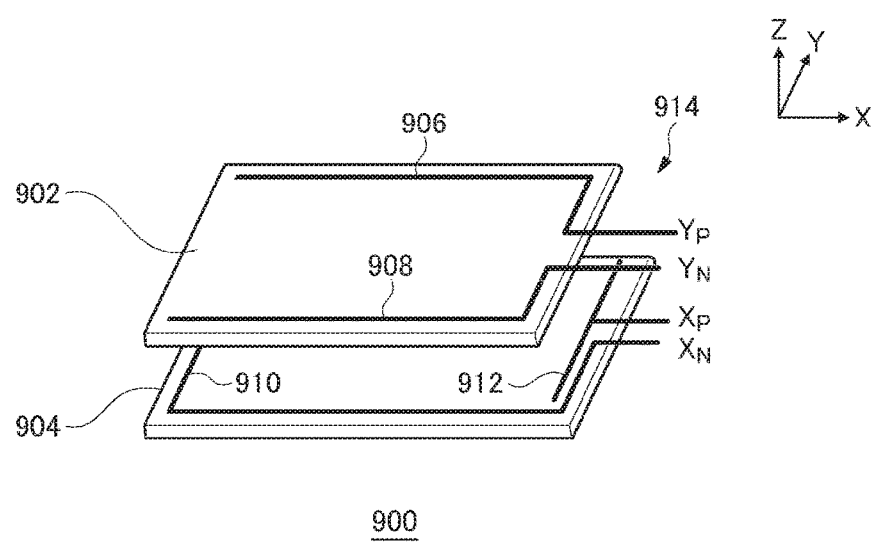
FIG. 1 is a diagram showing a configuration of a resistive film touch panel.
Figure 2A:
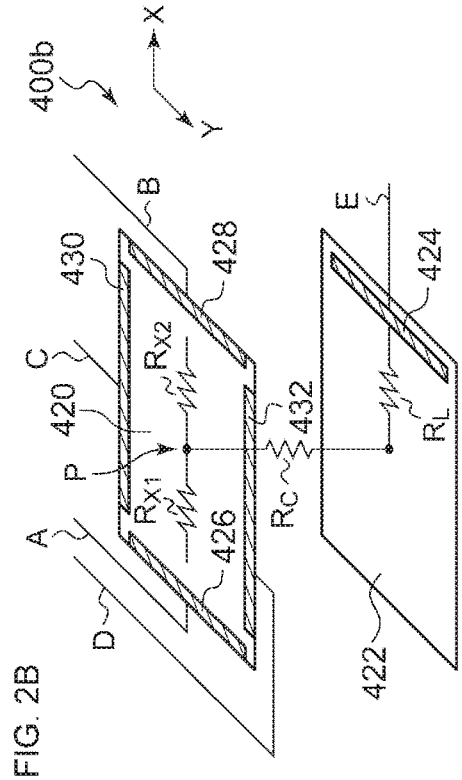
FIGS. 2A through 2D are diagrams each showing a resistive film touch panel.

First, description will be made regarding resistive film touch panels having different configurations to which a control circuit 200 according to an embodiment is applicable. FIGS. 2A through 2D are diagrams each showing a resistive film touch panel. FIG. 2A shows a typical four-line touch panel 400a. The four-line touch panel 400a includes two resistive films 402 and 404, a pair of electrodes 406 and 408 respectively arranged along two facing sides of the resistive film 402, and a pair of electrodes 410 and 412 respectively arranged along two facing sides of the resistive film 404. Four wires $X_1$, $X_2$, $Y_1$, and $Y_2$ are respectively drawn from the four electrodes 406, 408, 410, and 412, which are coupled to an unshown control circuit.

Let us consider a state in which the two resistive films 402 and 404 have come in contact with each other at a contact point P. In order to detect the X coordinate position, the unshown control circuit applies a power supply voltage (first fixed voltage) $V_{DD}$ to the electrode 406 of the resistive film 402, and applies a ground voltage (second fixed voltage) $V_{GND}$ to the electrode 408. The electric potential $V_P$ at the contact point P is represented by the following Expression (1).

$$V_P = V_{DD} \times R_{X2}/(R_{X1}+R_{X2}) \quad (1)$$

Here, the resistance value $R_{X1}$ represents a resistance value between the contact point P and the electrode 406. The resistance value $R_{X2}$ represents a resistance value between the contact point P and the electrode 408. The term $(R_{X1}+R_{X2})$ is a constant value, and $R_C$ represents a contact resistance. When the resistive film 404 side is set to a high-impedance state, the electric potential $V_P$ at the contact point P also occurs at both the electrodes 410 and 412. Accordingly, by measuring the voltage $V_P$ that occurs at either the electrode 410 or 412, such an arrangement is capable of detecting the resistance value $R_{X2}$, i.e., the X coordinate position.

In order to detect the Y coordinate position, the control circuit applies the power supply voltage $V_{DD}$ to the electrode 410 of the resistive film 404, and applies the ground voltage $V_{GND}$ to the electrode 412. The electric potential $V_P$ at the contact point P is represented by the following Expression (2).

$$V_P = V_{DD} \times R_{Y2}/(R_{Y1}+R_{Y2}) \quad (2)$$

Here, the resistance value $R_{Y1}$ represents a resistance value between the contact point P and the electrode 410. The resistance value $R_{Y2}$ represents a resistance value between the contact point P and the electrode 412. The term $(R_{Y1}+R_{Y2})$ is a constant value. When the resistive film 402 side is set to a high-impedance state, the electric potential $V_P$ at the contact point P also occurs at both the electrodes 406 and 408. Accordingly, by measuring the voltage $V_P$ that occurs at either the electrode 406 or 408, such an arrangement is capable of detecting the resistance value $R_{Y2}$, i.e., the Y coordinate position.

Figure 2B:
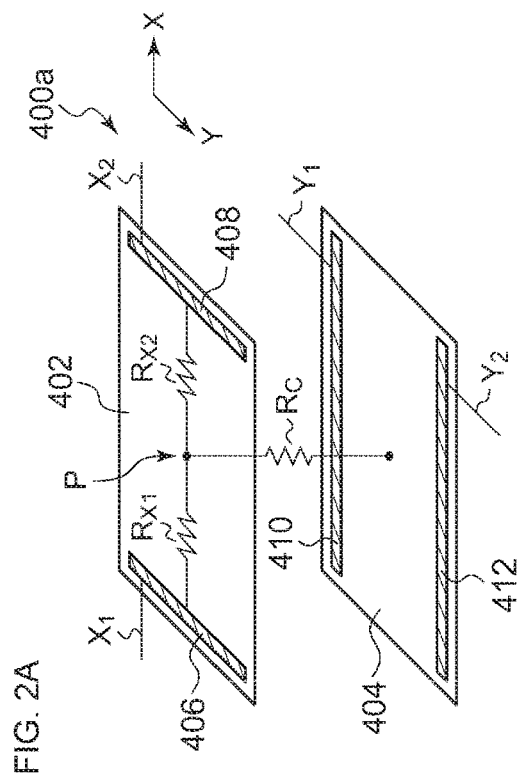

FIG. 2B shows a five-line touch panel 400b. The five-line touch panel 400b includes two resistive films 420 and 422, a pair of electrodes 426 and 428 respectively arranged along two facing sides of the resistive film 420, and a pair of electrodes 430 and 432 respectively arranged along two sides that are orthogonal to the aforementioned two facing sides. Five wires A through E are respectively drawn from the electrodes 426, 428, 430, and 432, and an electrode 424 provided to the resistive film 422, which are respectively coupled to an unshown control circuit.

In order to detect the X coordinate position, the control circuit applies the power supply voltage $V_{DD}$ to the wire A, applies the ground voltage $V_{GND}$ to the wire B, and sets the wires C and D to a high-impedance state. The electric potential $V_P$ at the contact point P is represented by the following Expression (1). It should be noted that description will be made assuming that the resistance values $R_{X1}$ and $R_{X2}$ are each greater than the contact resistance $R_C$ and the resistance value $R_L$ of the lower resistive film 422 ($R_{X1}$, $R_{X2} \gg R_C, R_L$).

$$V_P = V_{DD} \times R_{X2}/(R_{X1}+R_{X2}) \quad (1)$$

Here, the resistance value $R_{X1}$ represents a resistance value between the contact point P and the electrode 426. The resistance value $R_{X2}$ represents a resistance value between the contact point P and the electrode 428. When the resistive film 422 side is set to a high-impedance state, the electric potential $V_P$ at the contact point P also occurs at the resistive film 422. Accordingly, by measuring the voltage $V_P$ at the wire E, the control circuit is capable of detecting the resistance value $R_{X2}$, i.e., the X coordinate position.

In order to detect the Y coordinate position, the control circuit applies the power supply voltage $V_{DD}$ to the wire C, applies the ground voltage $V_{GND}$ to the wire D, and sets the wires A and B to a high-impedance state. The electric potential $V_P$ at the contact point P is represented by the following Expression (2).

$$V_P = V_{DD} \times R_{Y2}/(R_{Y1}+R_{Y2}) \quad (2)$$

Here, the resistance value $R_{Y1}$ (not shown) represents a resistance value between the contact point P and the electrode 430. The resistance value $R_{Y2}$ (not shown) represents a resistance value between the contact point P and the electrode 432. When the resistive film 422 side is set to a high-impedance state, the electric potential $V_P$ at the contact point P also occurs at the resistive film 422. Accordingly, by measuring the voltage $V_P$ at the wire E, the control circuit is capable of detecting the resistance value $R_{Y2}$, i.e., the Y coordinate position.

Figure 2C:
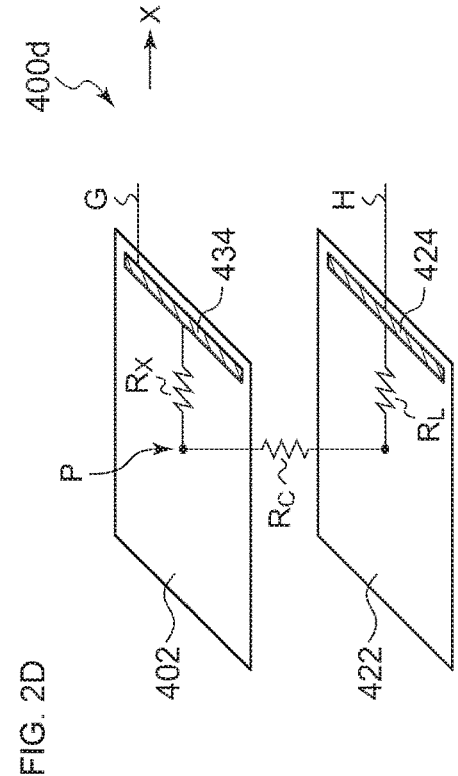

A touch panel 400c shown in FIG. 2C can be understood as a combination of the upper-side structure of the touch panel 400a shown in FIG. 2A and the lower-side structure shown in FIG. 2B. With such an arrangement, three wires, i.e., $X_1$, $X_2$, and F, are drawn. In the present specification, the touch panel 400c will be referred to as a "three-line touch panel". The touch panel 400c has a function of resolving the position in only the X direction. The control circuit is capable of detecting the X coordinate position by means of the same operations as with the four-line touch panel shown in FIG. 2A.

Figure 2D:
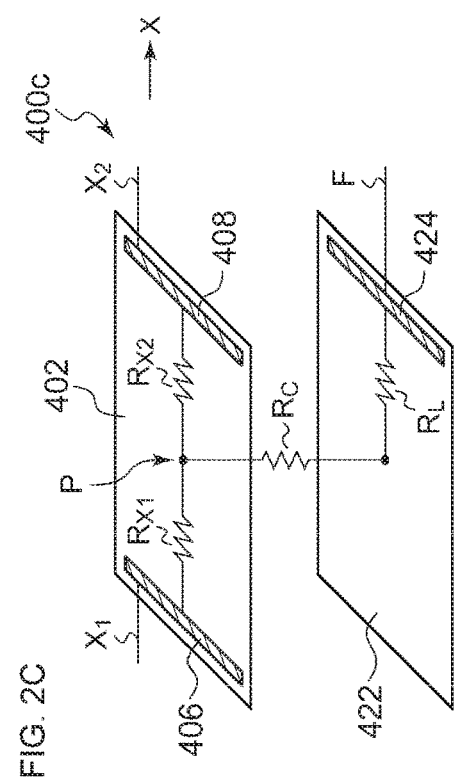

A touch panel 400d shown in FIG. 2D includes two resistive films 402 and 404 and an electrode 434. A wire G is drawn from the electrode 434, and a wire H is drawn from the resistive film 404, which are coupled to an unshown control circuit. The touch panel 400d has a has function of resolving the position in only the X direction.

In order to detect the X coordinate position, the control circuit measures a resistance value Z of a path from the electrode 434 to a lead point 436 via the contact point P.

$$Z = R_X + R_C + R_L$$

The measurement method for the resistance value Z is not restricted in particular. For example, the wire H may be pulled down via a known resistor r in a state in which the power supply voltage $V_{DD}$ is supplied to the wire G. In this state, the voltage $V_P$ at the wire H may be measured.

$$V_P = V_{DD} \times r/(r+Z)$$

The resistance value Z can be calculated based on the voltage $V_P$. In a case in which $R_C$ and $R_L$ are each a known value, the resistance value $R_{X1}$ can be calculated from the resistance value Z, thereby allowing the X coordinate position to be detected. The resistive film 432 may be configured as a metal film. In this case, the relation $R_L = 0$ holds true.

Alternatively, a known constant current $I_C$ may be supplied from the wire G in a state in which the wire H is grounded. In this state, the voltage $V_P$ at the wire G may be measured.

$$V_P = I_C \times Z$$

The control circuit according to the present embodiment supports the four kinds of touch panels shown in FIGS. 2A through 2D. Description will be made below regarding the configuration thereof.

Figure 3:
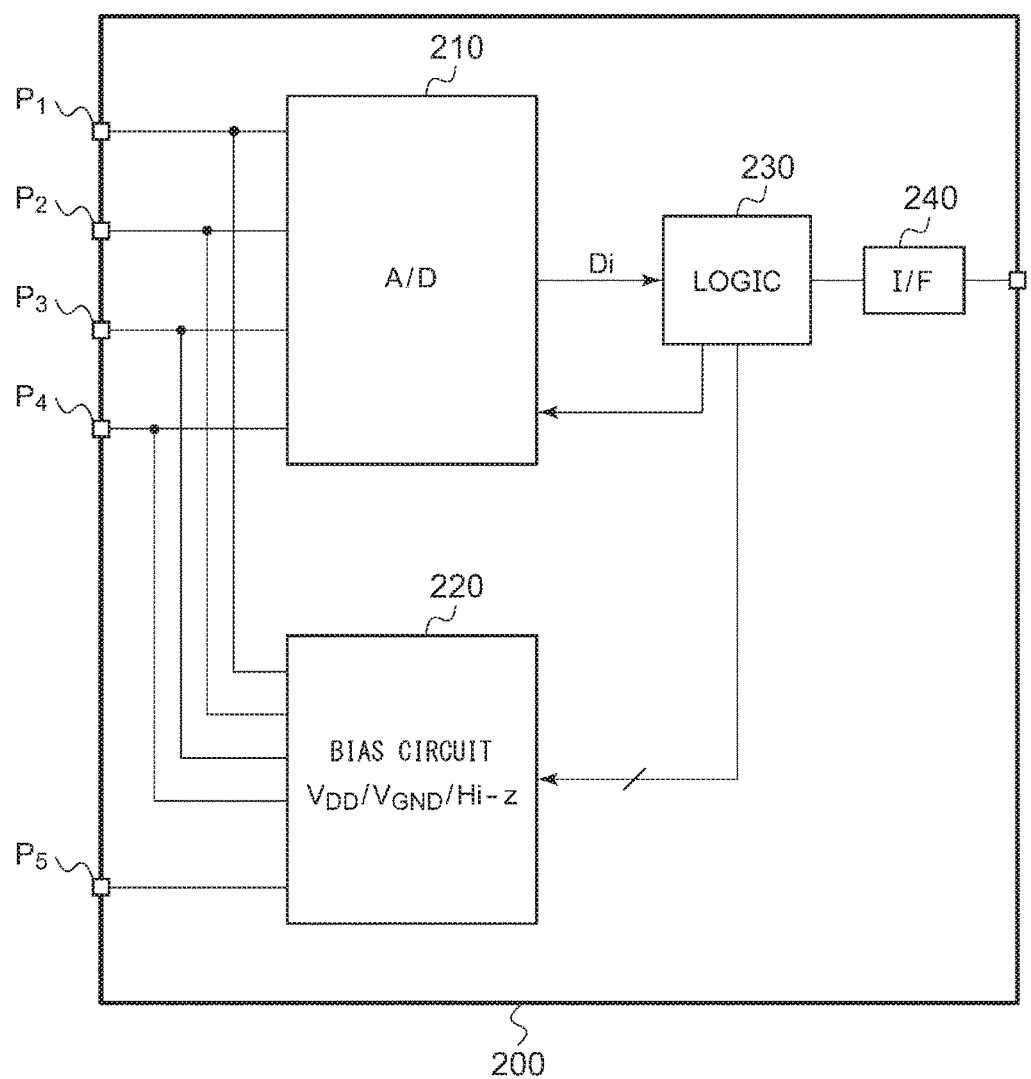
FIG. 3 is a block diagram showing a control circuit according to an embodiment.

FIG. 3 is a block diagram showing a control circuit 200 according to the embodiment. The control circuit 200 includes a first pin $P_1$, a second pin $P_2$, a third pin $P_3$, a fourth pin $P_4$, a fifth pin $P_5$, an A/D converter circuit 210, a bias circuit 220, a logic circuit 230, and an interface circuit 240. The fifth pin $P_5$ will also be referred to as the "common bias pin". The multiple pins $P_1$ through $P_5$ may be arranged along a single side of a package of the control circuit 200. A power supply pin, ground pin, interface pin, error output pin, and the like may be arranged along another side of the package. The kind of the package of the control circuit 200 is not restricted in particular. Specifically, the package may be configured as an insertion-type package such as a DPI (Dual Inline Package) or SIP (Single Inline Package), a surface-mount package such as a SOP (Small Outline Package) or QFP (Quad Flat Package), or the like.

The A/D converter circuit 210 is coupled to at least two from among the first pin $P_1$ through the fourth pin $P_4$. Furthermore, the A/D converter circuit 210 is configured to be capable of selecting at least one from among the pins thus coupled to the A/D converter 210, and to be capable of converting the voltage $V_i$ at the selected pin $P_i$ into a digital value $D_i$. With the present embodiment, the A/D converter circuit 210 is coupled to all of the first pin $P_1$ through the fourth pin $P_4$, and is capable of selecting i from among 1, 2, 3, and 4.

The bias circuit 220 is configured to selectively generate a combination in which the first pin $P_1$ through the fifth pin $P_5$ are each set to one from among a first predetermined voltage (e.g., the power supply voltage $V_{DD}$), a second predetermined voltage (e.g., the ground voltage $V_{GND}$), and a high-impedance state (Hi-Z). For example, the bias circuit 220 may be configured to be capable of selectively generating the power supply voltage $V_{DD}$, the ground voltage $V_{GND}$, and the high-impedance state (Hi-Z) for each of the first pin $P_1$ through the fifth pin $P_5$.

The logic circuit 230 processes an output signal of the A/D converter circuit 210, so as to detect the coordinate position touched by the user. Furthermore, the logic circuit 230 controls the pin to be selected by the A/D converter circuit 210. Moreover, the logic circuit 230 controls the combination of the electrical states to be generated by the bias circuit 220 for the first pin $P_1$ through the fifth pin $P_5$. The interface circuit 240 is coupled to an unshown processor. This allows the processor to read out, via the interface circuit 240, the information obtained as a result of the signal processing by means of the logic circuit 230. The information may include data that indicates the presence or absence of a touch, the coordinate data that indicates the touched position, and the like.

In the present embodiment, the control circuit 200 is switchable between the first mode through the fourth mode.

In the first mode, a single four-line resistive film touch panel is controlled using the first pin $P_1$ through the fourth pin $P_4$.

In the second mode, two three-line resistive film touch panels are controlled using the first pin $P_1$ through the fifth pin $P_5$.

In the third mode, a single five-line resistive film touch panel is controlled using the first pin $P_1$ through the fifth pin $P_5$.

In the fourth mode, two two-line resistive film touch panels are controlled using the first pin $P_1$ through the fourth pin $P_4$.

The above is the configuration of the control circuit 200. Next, description will be made regarding the operation thereof. FIGS. 4A through 4D are diagrams showing couplings between the touch panels 400a through 400d and the control circuit 200.

Figure 4B:
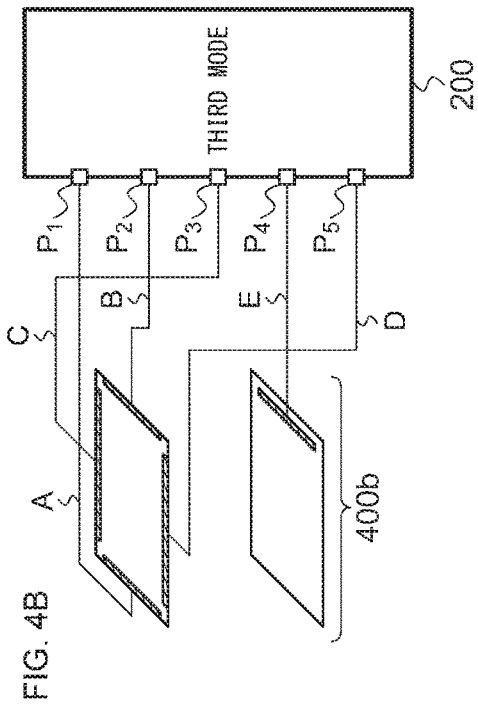
FIGS. 4A through 4D are diagrams each showing couplings between the touch panel and the control circuit.
Figure 4D:
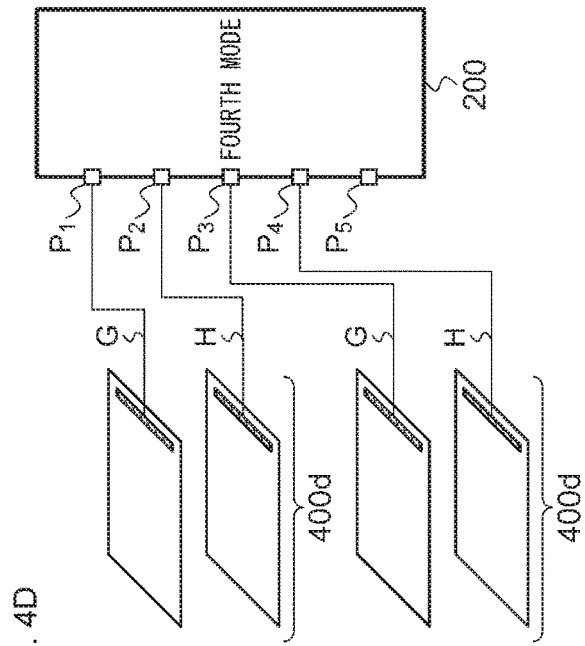
Figure 4A:
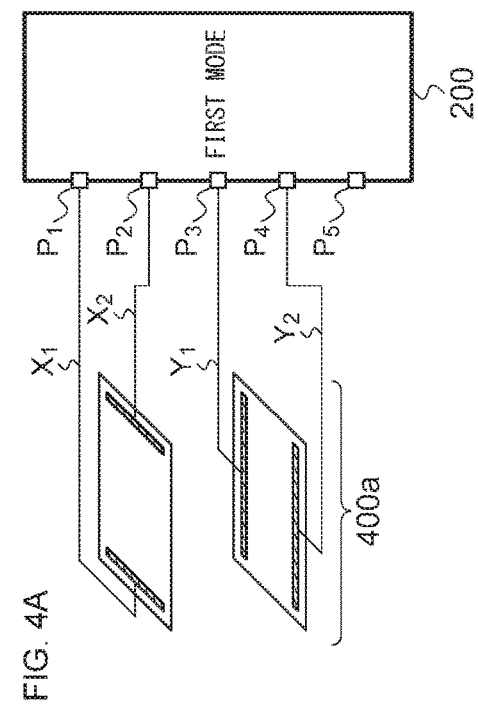

In FIG. 4A, the four-line touch panel 400a is employed. The control circuit 200 is set to the first mode. In this mode, the fifth pin $P_5$ of the control circuit 200 is not used.

In the first mode, the bias circuit 220 generates the following states.
[During X Coordinate Position Measurement]
  The first pin $P_1$ is set to the power supply voltage $V_{DD}$.
  The second pin $P_2$ is set to the ground voltage $V_{GND}$.
  The third pin $P_3$ is set to the high-impedance state Hi-Z.
  The fourth pin $P_4$ is set to the high-impedance state Hi-Z.
  The fifth pin $P_5$ is not used.
[During Y Coordinate Position Measurement]
  The first pin $P_1$ is set to the high-impedance state Hi-Z.
  The second pin $P_2$ is set to the high-impedance state Hi-Z.
  The third pin $P_3$ is set to the power supply voltage $V_{DD}$.
  The fourth pin $P_4$ is set to the ground voltage $V_{GND}$.
  The fifth pin $P_5$ is not used.

In the first mode, the A/D converter circuit 210 performs the following measurement.
[During X Coordinate Position Measurement]
  The voltage at the fourth pin $P_4$ is measured (or otherwise the voltage at the third pin $P_3$ may be measured).
[During Y Coordinate Position Measurement]
  The voltage at the second pin $P_2$ is measured (or otherwise the voltage at the first pin $P_1$ may be measured).

In FIG. 4B, the five-line touch panel 400b is employed. The control circuit 200 is set to the third mode. The wire E at which the voltage is to be measured is coupled to one from among the first pin $P_1$ through the fourth pin $P_4$ (in this example, the fourth pin $P_4$). The wires A through D to which the voltages are to be supplied are coupled to the remainder of the pins from among the first pin $P_1$ through the fourth pin $P_4$ (the first pin $P_1$ through the third pin $P_3$) and the fifth pin $P_5$, respectively.

In the third mode, the bias circuit 220 generates the following states. The state represented by "not used" can also be regarded as the high-impedance state.
[During X Coordinate Position Measurement]
  The first pin $P_1$ is set to the power supply voltage $V_{DD}$.
  The second pin $P_2$ is set to the ground voltage $V_{GND}$.
  The third pin $P_3$ is set to the high-impedance state Hi-Z.
  The fourth pin $P_4$ is set to the high-impedance state Hi-Z.
  The fifth pin $P_5$ is set to the high-impedance state Hi-Z.
[During Y Coordinate Position Measurement]
  The first pin $P_1$ is set to the high-impedance state Hi-Z.
  The second pin $P_2$ is set to the high-impedance state Hi-Z.
  The third pin $P_3$ is set to the power supply voltage $V_{DD}$.
  The fourth pin $P_4$ is set to the high-impedance state Hi-Z.
  The fifth pin $P_5$ is set to the ground voltage $V_{GND}$.

In the third mode, the A/D converter circuit 210 performs the following measurement.
[During X Coordinate Position Measurement, and During Y Coordinate Position Measurement]
  The voltage at the fourth pin $P_4$ is measured.

Figure 4C:
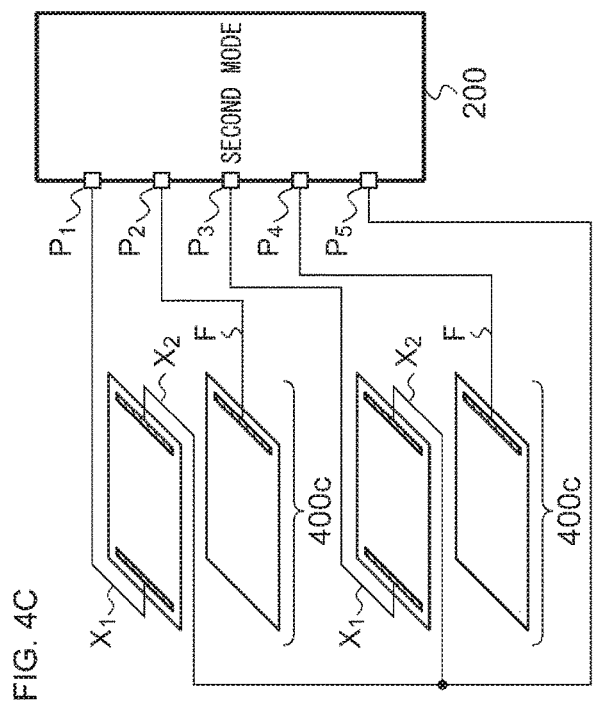

In FIG. 4C, two three-line touch panels 400c are employed. The wires F of the two respective touch panels 400c, at which the corresponding voltage is to be measured, are coupled to respective pins from among the first pin $P_1$ through the fourth pin $P_4$ (in this example, the second pin $P_2$ and the fourth pin $P_4$). Furthermore, the wires $X_2$ of the two respective touch panels 400c, to which a voltage (e.g., the ground voltage $V_{GND}$) is to be supplied, are coupled to a common pin, i.e., the fifth pin $P_5$. The wires $X_1$ of the two respective touch panels 400c, via which a voltage (e.g., the power supply voltage $V_{DD}$) is to be supplied, are coupled to the first pin $P_1$ and the third pin $P_3$, respectively.

In the second mode, the bias circuit 220 generates the following states.
[During X Coordinate Position Measurement]
  The first pin $P_1$ is set to the power supply voltage $V_{DD}$.
  The second pin $P_2$ is set to the high-impedance state Hi-Z.
  The third pin $P_3$ is set to the power supply voltage $V_{DD}$.
  The fourth pin $P_4$ is set to the high-impedance state Hi-Z.
  The fifth pin $P_5$ is set to the ground voltage $V_{GND}$.

In the second mode, the A/D converter circuit 210 performs the following measurement.
[During X Coordinate Position Measurement]
  The voltage at the second pin $P_2$ is measured.
  The voltage at the fourth pin $P_4$ is measured.

In FIG. 4D, two two-line touch panels 400d are employed. The control circuit 200 is set to the fourth mode. The wires H of the two respective touch panels 400d, at which the corresponding voltage is to be measured, are coupled to pins from among the first pin $P_1$ through the fourth pin $P_4$ (in this example, the second pin $P_2$ and the fourth pin $P_4$). Furthermore, the wires G of the two respective touch panels 400d, to which a voltage (e.g., the ground voltage $V_{GND}$) is to be supplied, are coupled to the remaining pins (in this example, the first pin $P_1$ and the third pin $P_3$).

In the fourth mode, the bias circuit 220 generates the following states.
[During X Coordinate Position Measurement]
  The first pin $P_1$ is set to the power supply voltage $V_{DD}$.
  The second pin $P_2$ is set to the high-impedance state Hi-Z (or otherwise pulsed downed via a high resistance).
  The third pin $P_3$ is set to the power supply voltage $V_{DD}$.
  The fourth pin $P_4$ is set to the high-impedance state Hi-Z (or otherwise pulsed downed via a high resistance).
  The fifth pin $P_5$ is not used.

In the fourth mode, the A/D converter circuit 210 performs the following measurement.
[During X Coordinate Position Measurement]
  The voltage at the second pin $P_2$ is measured.
  The voltage at the fourth pin $P_4$ is measured.

The above is the operation of the control circuit 200.

With the control circuit 200, it becomes possible to control multiple resistive film touch panels with a single control circuit. Accordingly, this allows the circuit mounting area to be reduced as compared with an arrangement in which a control circuit is provided for each resistive film touch panel.

Furthermore, the control circuit 200 requires only a slightly larger chip area as compared with those of conventional control circuits.

Moreover, by arranging the multiple pins $P_1$ through $P_5$ along a single side of the package of the control circuit 200, it becomes possible to simplify the wiring layout for coupling the control circuit 200 and one or otherwise two touch panels 400.

The present invention encompasses various kinds of apparatuses and circuits that can be regarded as a block configuration or a circuit configuration shown in FIG. 3, or otherwise that can be derived from the aforementioned description. That is to say, the present invention is not restricted to a specific configuration. More specific description will be made below regarding an example configuration or an example for clarification and ease of understanding of the essence of the present invention and the circuit operation. That is to say, the following description will by no means be intended to restrict the technical scope of the present invention.

Figure 5:
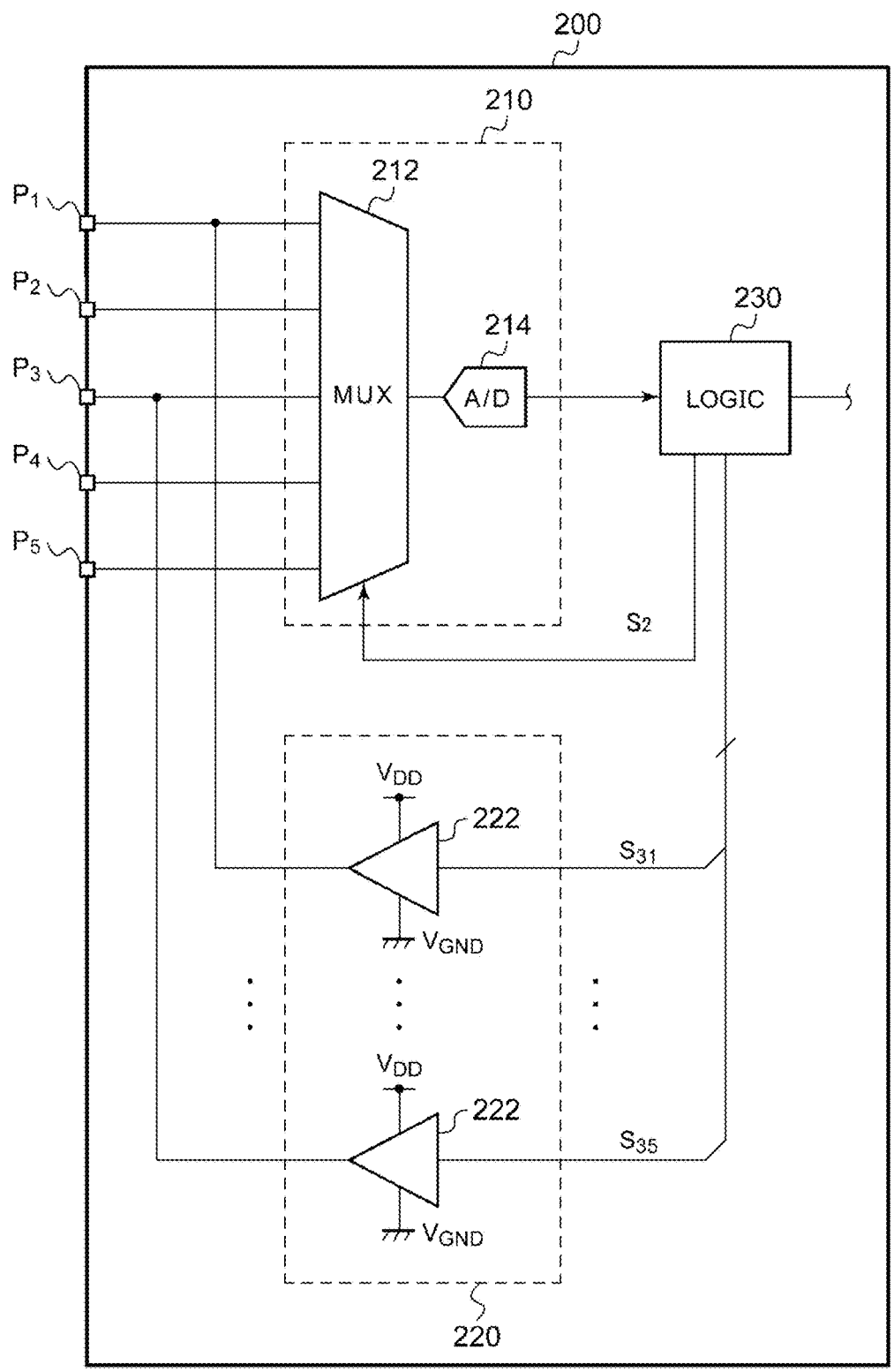
FIG. 5 is a block diagram showing a first example configuration of the control circuit.

FIG. 5 is a block diagram showing a first example configuration (200a) of the control circuit 200. The control circuit 200a has versatility that allows all the pins $P_1$ through $P_5$ to function as comparable pins. The A/D converter circuit 210 includes a multiplexer 212 and an A/D converter 214. The multiplexer 212 selects one from among the first pin $P_1$ through the fifth pin $P_5$ based on a control signal S2 received from the logic circuit 230. The A/D converter 214 converts the signal output from the pin selected by the multiplexer 212 into a digital value. That is to say, the A/D converter circuit 210 is capable of detecting the voltage that occurs at each of the pins.

Directing attention to the state of the A/D converter circuit 210 in the first mode through the fourth mode, the A/D converter circuit 210 may measure only the voltages at the second pin $P_2$ and the fourth pin $P_4$, which is sufficient. Accordingly, only the second pin $P_2$ and the fourth pin $P_4$ may be coupled to the inputs of the multiplexer 212.

In contrast, in the case of a configuration such that the voltage can be measured for each of the pins $P_1$ through $P_5$ as shown in FIG. 5, such an arrangement is applicable to calibration, a function test, etc., which is advantageous.

The bias circuit 220 is configured to be capable of switching the output state between the power supply voltage $V_{DD}$, the ground voltage $V_{GND}$, and the high-impedance state, for each of the pins $P_1$ through $P_5$. For example, the bias circuit 220 includes a voltage source 222 provided for each pin. The i-th voltage source 222 is capable of switching its output state between the three states ($V_{DD}$, $V_{GND}$, Hi-Z) based on the control signal $S_{3i}$ received from the logic circuit 230.

Figure 6A:
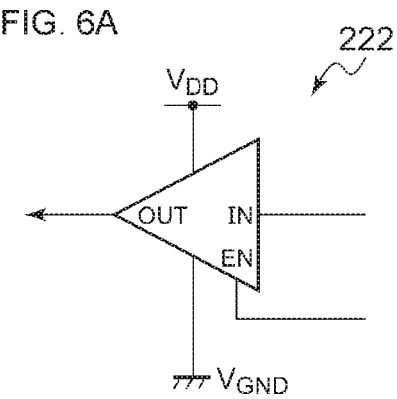
FIGS. 6A through 6D are circuit diagrams each showing an example configuration of a voltage source.

FIGS. 6A through 6D are circuit diagrams each showing an example configuration of the voltage source 222. The voltage source 222 shown in FIG. 6A is configured as a buffer (or otherwise inverter) with an enable pin. When a low-level signal is input to the enable pin, for example, the voltage source 222 is set to the disabled state. In this case, the output OUT is set to the high-impedance state Hi-Z regardless of the input IN. On the other hand, when a high-level signal is input to the enable pin, the output OUT is set to either the voltage $V_{DD}$ or $V_{GND}$ according to the input IN.

Figure 6B:
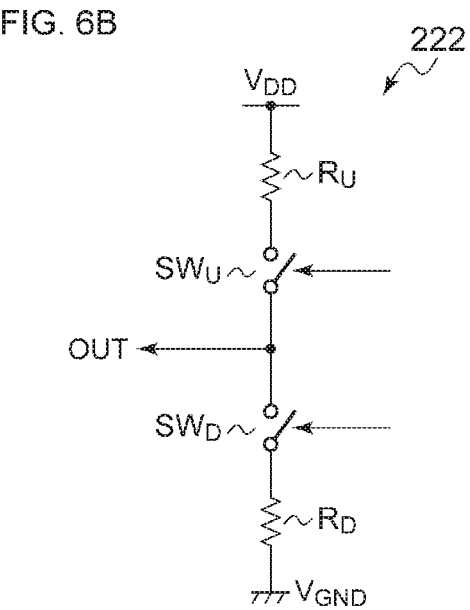

The voltage source 222 shown in FIG. 6B is configured as a combination of switches and resistors. The on/off states of a pull-up switch $SW_U$ and a pull-down switch $SW_D$ are each controlled by the logic circuit 230. When the two switches $SW_U$ and $SW_D$ are both turned off, the output OUT is set to the high-impedance state. When the pull-up switch $SW_U$ is turned on, and the pull-down switch $SW_D$ is turned off, the voltage $V_{DD}$ develops at the output OUT. When the pull-up switch $SW_U$ is turned off, and the pull-down switch $SW_D$ is turned on, the voltage $V_{GND}$ develops at the output OUT. Also, a pull-up resistor $R_U$ and a pull-down resistor $R_D$ may be omitted.

Figure 6C:
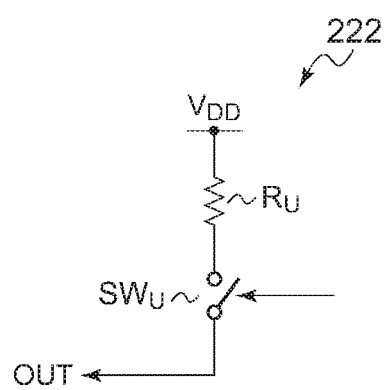
Figure 6D:
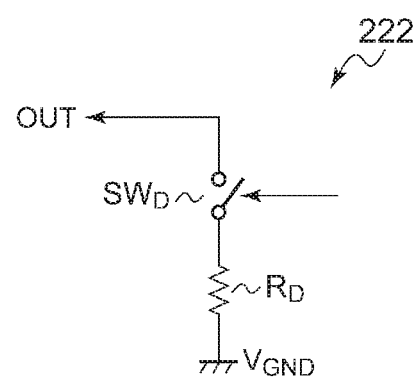

The voltage source 222 shown in FIG. 6C is switchable between two states, i.e., the high-impedance state and the voltage $V_{DD}$. The voltage source 222 shown in FIG. 6D is switchable between two states, i.e., the high-impedance state and the voltage $V_{GND}$.

The voltage sources 222 may have different circuit configurations for the respective pins $P_1$ through $P_5$. For example, in order to support the first mode through the fourth mode described above, it is sufficient for an arrangement to be made in which the states of the first pin $P_1$ through the fifth pin $P_5$ are each switchable as follows.

$P_1$ is switchable between the high-impedance Hi-Z state and the power supply voltage $V_{DD}$ state.

$P_2$ is switchable between the high-impedance Hi-Z state and the ground voltage $V_{GND}$ state.

$P_3$ is switchable between the high-impedance Hi-Z state and the power supply voltage $V_{DD}$ state.

$P_4$ is switchable between the high-impedance Hi-Z state and the ground voltage $V_{GND}$ state.

$P_5$ is switchable between the high-impedance Hi-Z state and the ground voltage $V_{GND}$ state.

Accordingly, the voltage sources 222 that correspond to the first pin $P_1$ and the third pin $P_3$ may each have the configuration shown in FIG. 6C. The voltage sources that correspond to the second pin $P_2$, the fourth pin $P_4$, and the fifth pin $P_5$ may each have the configuration shown in FIG. 6D.

It should be noted that the states of each pin in the first mode through the fourth mode are not restricted to such an example described above, and the same functions can be supported by exchanging the pins or the like, which can be understood by those skilled in this art.

Figure 7:
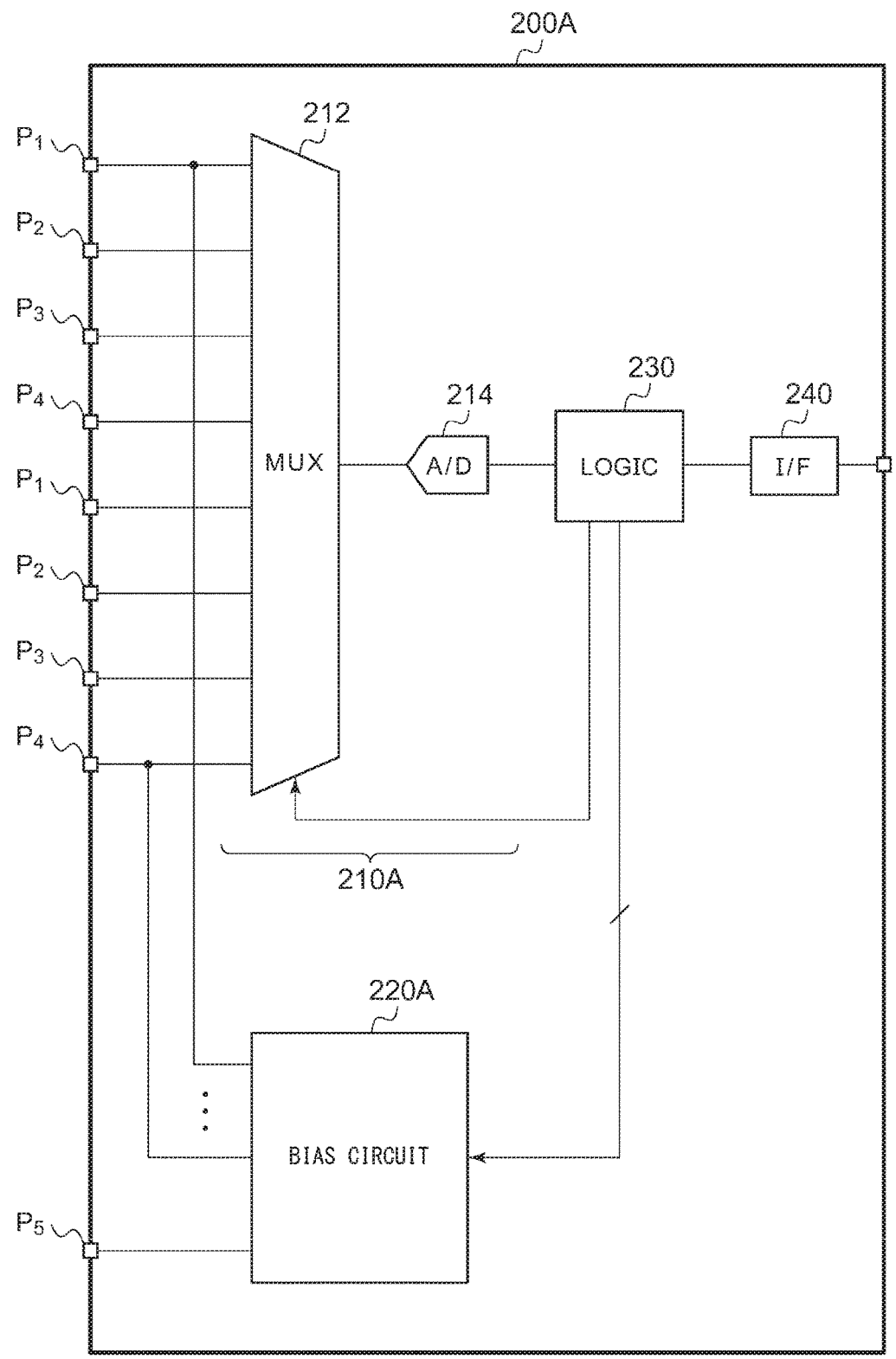
FIG. 7 is a block diagram showing a control circuit that is capable of controlling an even larger number of touch panels.

FIG. 7 is a block diagram showing a control circuit 200A that is capable of controlling a greater number of touch panels 400. The control circuit 200A is provided with multiple (i.e., M, which represents a number equal to or greater than 2) sets of the first pin $P_1$ through the fourth pin $P_4$. The fifth pin $P_5$ is shared by the multiple sets. That is to say, the control circuit 200A includes M sets, each of which comprises the first pin $P_1$ through the fourth pin $P_4$. Furthermore, the control circuit 200A includes the single fifth pin $P_5$. With such an arrangement, the control circuit 200A is capable of selecting the mode for each set. FIG. 7 shows an arrangement in which M=2. Also, M may be 3 or more.

The A/D converter circuit 210A includes a multiplexer 212 and an A/D converter 214. The inputs of the multiplexer 212 are coupled to the M sets of pins $P_1$ through $P_4$. The A/D converter 214 converts the voltages at the multiple pins into respective digital values in a time sharing manner. That is to say, the single A/D converter 214 is shared by the multiple sets in a time sharing manner. A bias circuit 220A is coupled to the M sets of pins $P_1$ through $P_4$ and the single fifth pin $P_5$, and is configured to be capable of switching the state of each pin.

With the control circuit 200A shown in FIG. 7, the A/D converter 214 is shared by the multiple sets, thereby suppressing an increase in the circuit area. In other words, this enables chip shrink as compared with an arrangement in which the A/D converter 214 is provided for each set.

In a case in which M control circuits 200 shown in FIG. 3 are employed in parallel, the number of pins to be coupled to the touch panels is (M×5). In contrast, with the control circuit 200A shown in FIG. 7, the number of pins is (M×4+1), which is smaller by 4. The reduction in the number of pins means a reduction in the number of wires arranged on the mounting substrate. This allows the circuit mounting area to be reduced.

Figure 8:
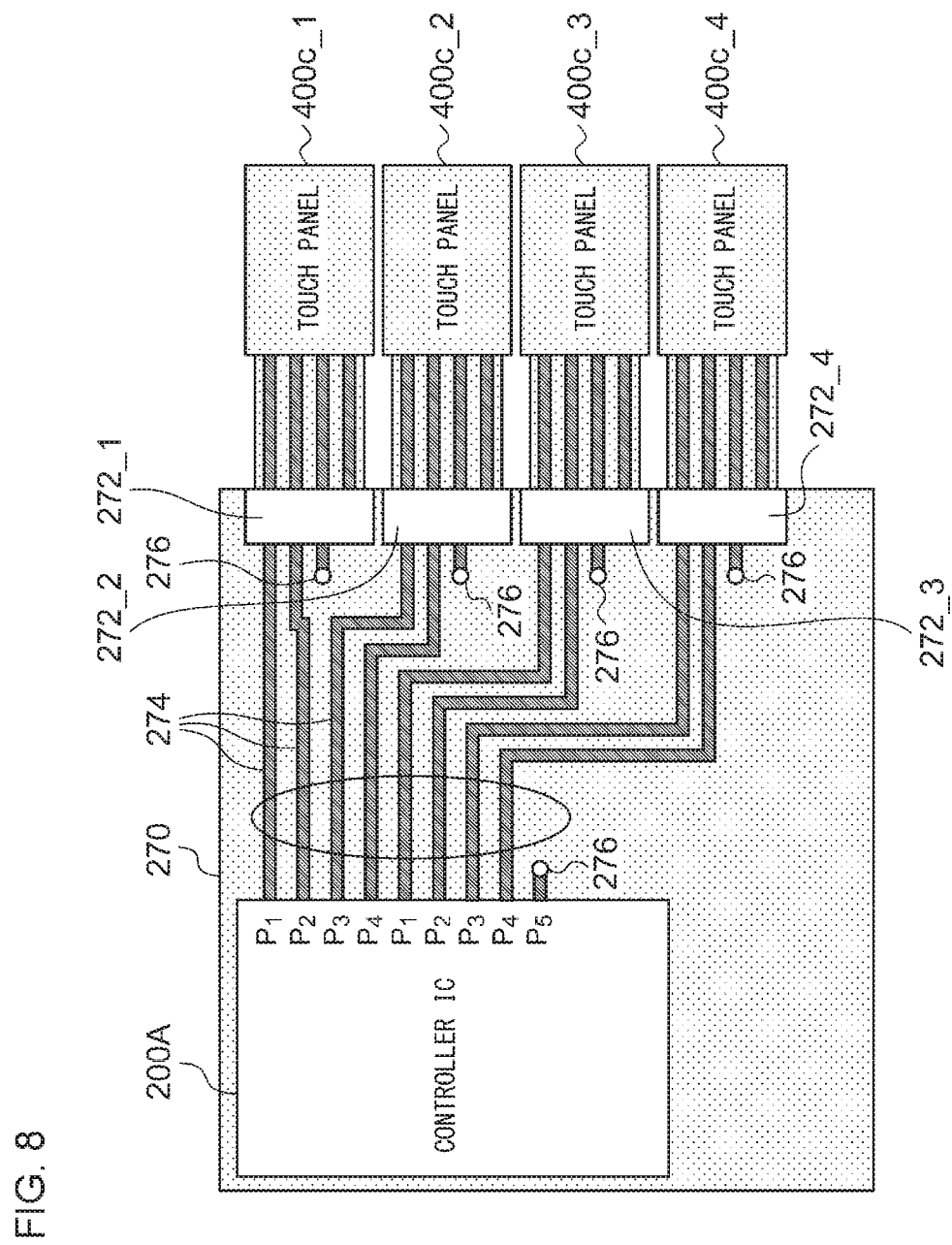
FIG. 8 is a diagram showing an example of the layout of a control circuit and multiple touch panels.

The control circuit 200A shown in FIG. 7 also has a structure in which all the pins $P_1$ through $P_5$ are arranged along one side of a package of the control circuit 200A. FIG. 8 is a diagram showing an example of the layout of the control circuit 200A and the multiple touch panels 400c. FIG. 8 shows an arrangement in which M=2. In this example, four three-line touch panels 400c are employed. The control circuit 200A is mounted on a mounting substrate 270. Furthermore, connectors 272_1 through 272_4 are provided along one side of the mounting substrate 270. Four touch panels 400c_1 through 400c_4 are detachably coupled to the connectors 272_1 through 272_4, respectively. Moreover, wires 274 are formed on the mounting substrate 270 in order to couple each pin of the control circuit 200A and a corresponding pin of the connector 272.

As shown in FIG. 8, in a case in which the multiple resistive film touch panels 400 are used as an operation interface, an arrangement can be assumed in which the multiple resistive film touch panels 400 are arranged side by side or in parallel. In this case, by arranging the first pin $P_1$ through the fifth pin $P_5$ along one side of the control circuit 200A, this allows the wiring layout of the wires 274 to be simplified. It should be noted that the reference numerals 276 represent via holes. The multiple via holes are electrically coupled to the back face wiring (or intermediate wiring layer) of the mounting substrate 270.

Figure 9:
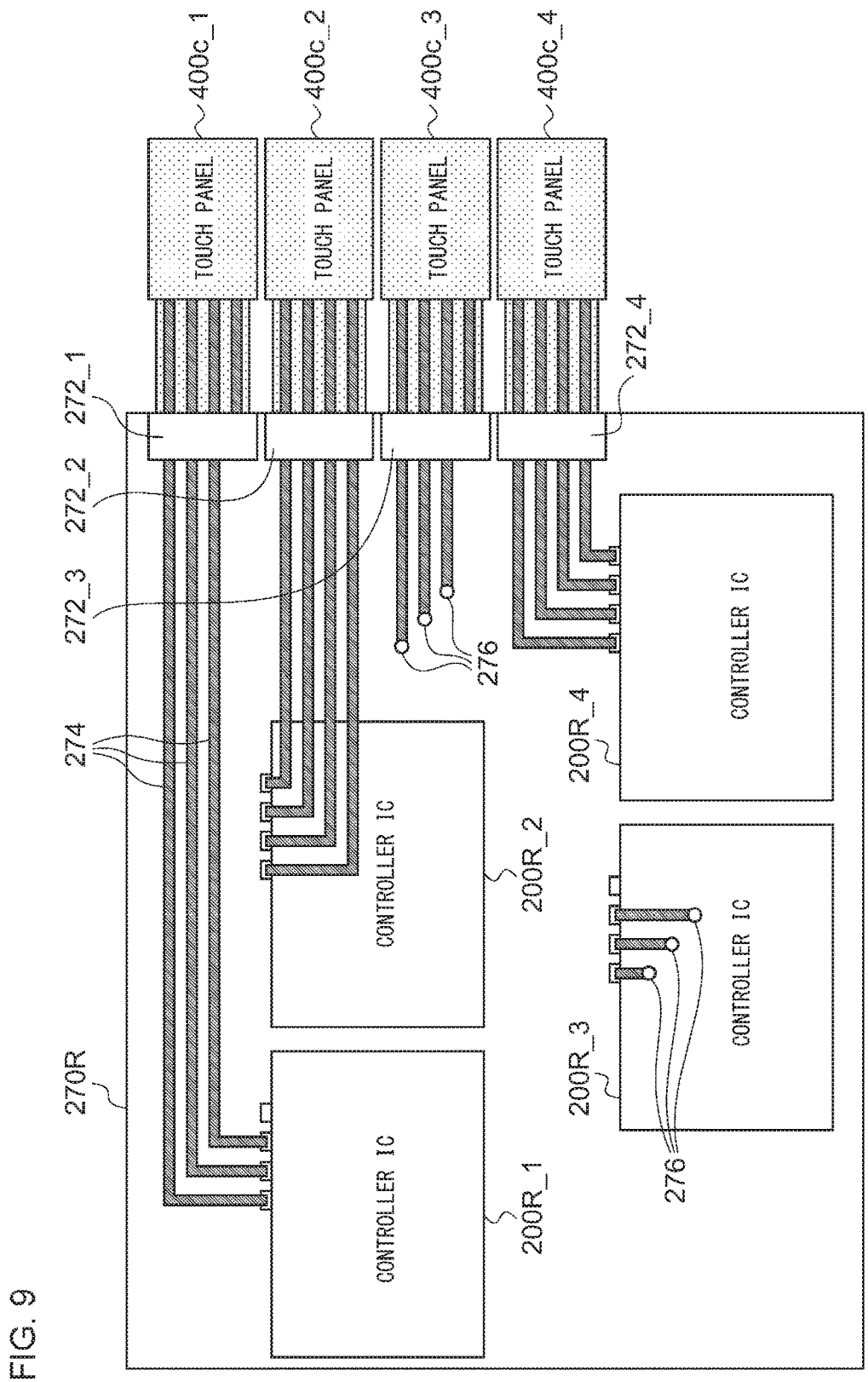
FIG. 9 is a diagram showing an example of the layout of a control circuit and multiple touch panels according to a conventional technique.

The advantages of the layout shown in FIG. 8 can be clearly understood in comparison with the layout shown in FIG. 9. With conventional techniques, as shown in FIG. 9, four control circuits 200R_1 through 200R_4 are required in order to control the four three-line touch panels 400c_1 through 400c_4. It should be noted that the four control circuits 200R_1 through 200R_4 each have the same package and the same pin layout.

Comparing FIG. 8 and FIG. 9, it can be clearly understood that this provides a marked reduction in the area of the mounting substrate 270, and provides a simple wiring layout.

Figure 10A:
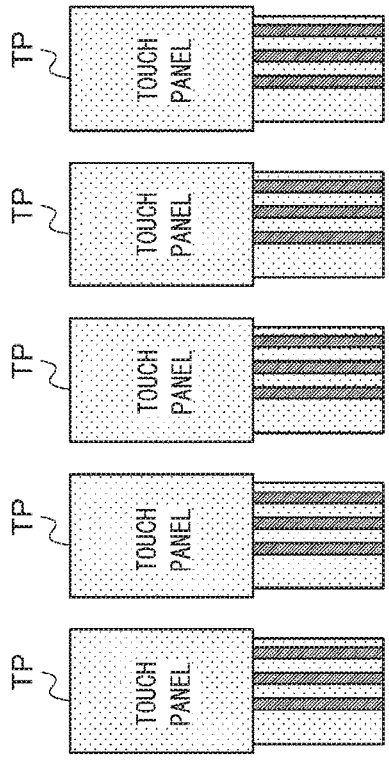
FIGS. 10A through 10C are diagrams for describing a division mode.
Figure 10B:
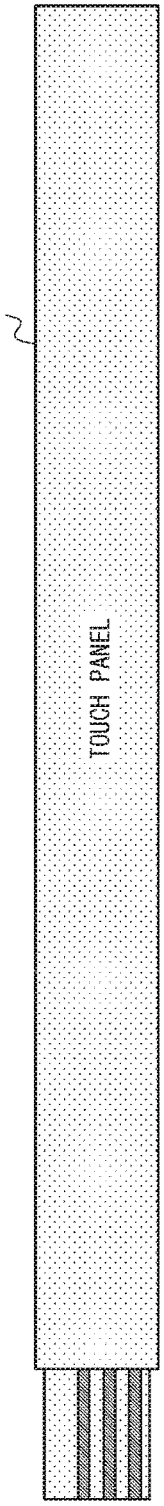
Figure 10C:
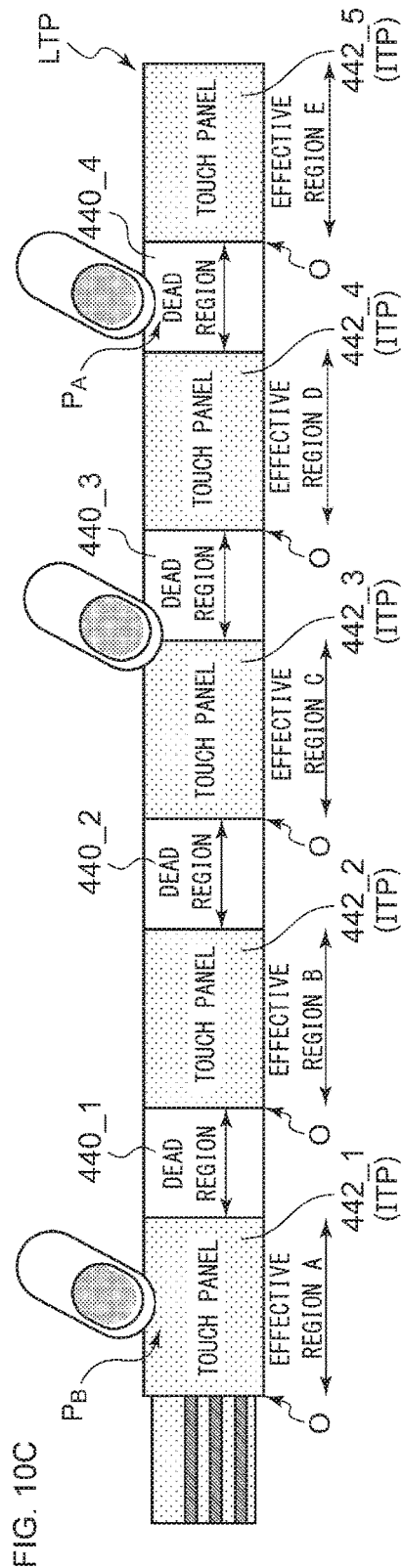

Next, description will be made regarding an additional function (which will be referred to as the "division mode" hereafter) that can be provided to the aforementioned control circuit 200. FIGS. 10A through 10C are diagrams for describing the division mode.

As shown in FIG. 10A, in some cases, there is a demand to use multiple touch panels TP arranged side by side. Conventionally, with such multiple touch panels TP arranged side by side, there is a need to arrange multiple control circuits that correspond to the respective touch panels. This involves a very large circuit area, which is a problem.

In contrast, in the division mode, as shown in FIG. 10B, a single touch panel LTP is employed, having a long side extending in the direction along which the multiple touch panels shown in FIG. 10A are arranged. The single touch panel LTP is controlled as multiple touch panels (which will be referred to as "virtual touch panels ITP"). Specifically, the resistive film touch panel LTP is divided into at least one dead region 440 and multiple effective regions 442 partitioned by the at least one dead region 440 such that they are arranged in the longitudinal direction. A control circuit 200B operates each effective region 442 as a single virtual touch panel ITP. In FIG. 10C, the touch panel LTP is divided into four dead regions 440_1 through 440_4 and five effective regions 442_1 through 442_5. It should be noted that the division is performed virtually. That is to say, the touch panel LTP is by no means divided in a physical manner that can be distinguished from its external view.

Such an arrangement allows the start point (coordinate origin O) of the at least one dead region 440 and the effective regions 442 to each be set via an external circuit by writing data to a register or memory.

The logic circuit 230 of the control circuit 200B detects the coordinate position P that has been touched, in the mode that corresponds to the kind of the panel (two-line through five-line). It should be noted that, in a case in which the touch panel is used in the division mode and in a case in which resolution is not required in a direction that is orthogonal to the longitudinal direction of the touch panel, a three-line touch panel is preferably employed.

With such an arrangement, when the detected coordinate position PA is included in the dead region 440, the detected touch is judged to be ineffective. When the touched coordinate position $P_B$ is included in the effective region 442, the logic circuit 230 instructs memory to hold the identification number of the effective region including the touched position (when the touched coordinate position $P_B$ is included in 442_1, "1" is held). By accessing the memory, such an arrangement allows an external microcomputer to acquire information about which virtual touch panel ITP has been touched. As viewed from the outside, this allows each virtual touch panel to be operated as a single switch (button). Accordingly, such an arrangement allows a single touch panel to be used as five switches.

Also, after the coordinate origin O is determined for each effective region 442, the logic circuit 230 may instruct the memory to hold relative coordinate information with respect to the touched coordinate position. This allows an external microcomputer to operate multiple virtual touch panels as if they were multiple individual touch panels.

It should be noted that the division mode is by no means to be regarded as typical software keys (software buttons). With typical software keys, the region judgment is performed by means of a higher-level microcomputer by processing the coordinate position detected by the control circuit 200, so as to judge which key has been touched. In contrast, in the division mode, the region judgment is not performed by such a microcomputer.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the control circuit supports all the first mode through the fifth mode. However, the present invention is not restricted to such an arrangement. Also, a desired combination thereof may be supported.

The architecture of the division mode described with reference to FIG. 10 is not restricted to the control circuit 200 shown in FIG. 3. Also, such an architecture may be employed in conventional control circuits. Such an arrangement is also encompassed within the scope of the present invention.

A five-line touch panel is known having a structure in which four electrodes are provided to four respective portions in the vicinity of the four corners of one resistive film 420, and four wires A through D are respectively drawn from the four electrodes. By modifying the bias circuit 220, such a five-line touch panel can be supported.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a resistive film touch panel, comprising:
    a first pin, a second pin, a third pin, a fourth pin, and a fifth pin;
    an A/D converter circuit structured to be capable of selecting at least one from among the first pin through the fourth pin, and to be capable of converting a voltage at at least one pin thus selected into a digital value;
    a bias circuit structured to be capable of selectively generating a combination of electrical states including a first predetermined voltage state, a second predetermined voltage state, and a high-impedance state, for the first pin through the fifth pin; and
    a logic circuit structured to control the A/D converter circuit to select a pin, to control the combination of the electrical states to be generated by the bias circuit, and to process an output signal of the A/D converter circuit,
    wherein a plurality of sets each comprising the first pin through the fourth pin is provided,
    wherein the fifth pin is shared by the plurality of sets,
    wherein the mode is settable for each of the sets, and
    wherein the first pin through the fifth pin are all arranged along one side of the package.

2. The control circuit according to claim 1, wherein the logic circuit is structured to be switchable between:
    a first mode in which a single four-line resistive film touch panel is controlled using the first pin through the fourth pin; and
    a second mode in which two three-line resistive touch panels are controlled using the first pin through the fifth pin.

3. The control circuit according to claim 2, wherein, in addition to the first mode and the second mode, or otherwise instead of either one from among the first mode or the second mode, the logic circuit is structured to be switchable to a third mode in which a single five-line resistive film touch panel is controlled using the first pin through the fifth pin.

4. The control circuit according to claim 2, wherein, in addition to the first mode and the second mode, or otherwise instead of either one from among the first mode or the second mode, the logic circuit is structured to be switchable to a fourth mode in which two two-line resistive film touch panels are controlled using the first pin through the fourth pin.

5. The control circuit according to claim 1, wherein the first pin through the fifth pin are arranged along one side of a package.

6. The control circuit according to claim 1, wherein the A/D converter circuit comprises a single A/D converter to be used by the plurality of sets in a time sharing manner.

7. The control circuit according to claim 1, wherein the resistive film touch panel has a rectangular shape having a long side in one direction,
    wherein the logic circuit is structured to divide the resistive film touch panel into at least one dead region and a plurality of effective regions partitioned by the at least one dead region such that the regions are arranged in a longitudinal direction,
    and wherein the logic circuit is structured to be capable of judging which effective region has been touched.

8. A touch input apparatus comprising:
    at least one resistive film touch panel; and
    the control circuit according to claim 1, structured to control the at least one resistive film touch panel.

* * * * *